(12) United States Patent
Macron et al.

(10) Patent No.: US 10,569,614 B2
(45) Date of Patent: Feb. 25, 2020

(54) METHOD AND DEVICE FOR REFRIGERATED TRANSPORT USING AN INDIRECT INJECTION OF A CRYOGENIC LIQUID AND A HEATING SYSTEM FOR MAINTAINING TEMPERATURE IN THE EVENT OF EXTREMELY LOW OUTSIDE TEMPERATURES

(71) Applicant: L'Air Liquide, Societe Anonyme pour l'Etude et l'Exploitation des Procedes Georges Claude, Paris (FR)

(72) Inventors: Jonathan Macron, Paris (FR); Celso Zerbinatti, Buc (FR); Dominique Jouvaud, Paris (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 858 days.

(21) Appl. No.: 14/410,918

(22) PCT Filed: Jun. 11, 2013

(86) PCT No.: PCT/FR2013/051356
§ 371 (c)(1),
(2) Date: Dec. 23, 2014

(87) PCT Pub. No.: WO2014/006292
PCT Pub. Date: Jan. 9, 2014

(65) Prior Publication Data
US 2015/0144296 A1    May 28, 2015

(30) Foreign Application Priority Data
Jul. 3, 2012  (FR) ..................... 12 56358

(51) Int. Cl.
*B60H 1/00*   (2006.01)
*B60P 3/20*   (2006.01)
(Continued)

(52) U.S. Cl.
CPC ..... *B60H 1/00007* (2013.01); *B60H 1/00014* (2013.01); *B60H 1/2212* (2013.01);
(Continued)

(58) Field of Classification Search
CPC ............. B60H 1/00007; B60H 1/2212; B60H 1/3202; B60H 1/00014; B60H 2001/2293; B60P 3/20; F25D 29/003
(Continued)

(56) References Cited

U.S. PATENT DOCUMENTS 4,186,562 A * 2/1980 Tyree, Jr. .................. F25D 3/10
                                                       62/165
4,498,306 A * 2/1985 Tyree, Jr. .................. B60P 3/20
                                                       165/104.21
(Continued)

FOREIGN PATENT DOCUMENTS

DE   10 2008 029853   12/2009
FR   2 969 061         6/2012
(Continued)

OTHER PUBLICATIONS

International Search Report for PCT/FR2013/051356, dated Sep. 4, 2013.
(Continued)

*Primary Examiner* — Ljiljana V. Ciric
(74) *Attorney, Agent, or Firm* — Christopher J. Cronin (57) ABSTRACT

A method for transporting heat-sensitive products in a refrigerated truck that includes at least one product storage chamber, a cryogenic fluid reserve, and a main heat exchanger system for circulation of the cryogenic fluid
(Continued)

therethrough. The main heat exchange system includes walls across which heat may be exchanged, one or more cold-producing blowers for bringing air inside the chamber into contact with the walls, and a heating system for heating air inside at least one of the chambers. Upon the occurrence of one or more events, heated air is blown into an intake side of the cold-producing blower(s).

8 Claims, 3 Drawing Sheets

(51) Int. Cl.
    *B60H 1/32*     (2006.01)
    *B60H 1/22*     (2006.01)
    *F25D 29/00*     (2006.01)

(52) U.S. Cl.
    CPC .............. *B60H 1/3202* (2013.01); *B60P 3/20* (2013.01); *F25D 29/003* (2013.01); *B60H 2001/2293* (2013.01)

(58) Field of Classification Search
    USPC .......................................................... 62/48.3
    See application file for complete search history.

(56) References Cited

U.S. PATENT DOCUMENTS

| | | | | |
|---|---|---|---|---|
| 4,576,010 A * | 3/1986 | Windecker | ............ | F25D 29/001 62/161 |
| 4,986,086 A * | 1/1991 | de Langavant | ...... | B60H 1/3202 62/208 |
| 5,267,443 A * | 12/1993 | Roehrich | ............. | B60H 1/3202 62/167 |
| 5,315,840 A * | 5/1994 | Viegas | ................. | B60H 1/3202 62/167 |
| 5,365,744 A * | 11/1994 | Viegas | ............... | B60H 1/00007 62/239 |
| 5,730,216 A * | 3/1998 | Viegas | ............... | B60H 1/00007 165/233 |
| 5,979,173 A * | 11/1999 | Tyree | ...................... | F25D 3/125 62/385 |
| 6,044,648 A * | 4/2000 | Rode | ......................... | F25D 3/10 62/50.2 |
| 2002/0129613 A1 | 9/2002 | Viegas et al. | | |
| 2009/0183514 A1* | 7/2009 | Holmes | ................... | F25D 3/125 62/51.1 |
| 2013/0340444 A1* | 12/2013 | Bryant | ............... | B60H 1/00964 62/62 |
| 2014/0208795 A1* | 7/2014 | Bell | ...................... | F25D 17/042 62/419 |
| 2015/0144296 A1* | 5/2015 | Macron | ..................... | B60P 3/20 165/11.1 |
| 2018/0043754 A1* | 2/2018 | Youbi-Idrissi | ..... | B60H 1/00014 |

FOREIGN PATENT DOCUMENTS

| | | | | |
|---|---|---|---|---|
| WO | WO 2010 128 233 | | 11/2010 | |
| WO | WO-2010128233 A1 * | 11/2010 | ............ | F25D 3/105 |
| WO | WO-2013004946 A1 * | 1/2013 | ............ | F25D 3/105 |

OTHER PUBLICATIONS

Search Report and Written Opinion for FR1256358, dated Apr. 12, 2013.

* cited by examiner

METHOD AND DEVICE FOR REFRIGERATED TRANSPORT USING AN INDIRECT INJECTION OF A CRYOGENIC LIQUID AND A HEATING SYSTEM FOR MAINTAINING TEMPERATURE IN THE EVENT OF EXTREMELY LOW OUTSIDE TEMPERATURES

CROSS-REFERENCE TO RELATED APPLICATIONS

This application is a § 371 of International PCT Application PCT/FR2013/051356, filed Jun. 11, 2013, which claims § 119(a) foreign priority to French patent application FR1256358, filed Jul. 3, 2012.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

Field of the Invention

The present invention relates to the field of the transport and distribution of heat-sensitive products, such as pharmaceutical products and foodstuffs. In this field, the cold necessary for keeping the products at low temperature is provided mainly using two different technologies:
  mechanical vapor-compression refrigeration units operating in a closed loop;
  cryogenic units operating in open loop employing the direct or indirect injection of cryogenic fluids into the space containing the products, and in particular injection of liquid nitrogen.
The present invention relates more particularly to indirect-injection cryogenic solutions (this sector of industry talks about "CTI" for "indirect" solutions).

Background Art

In indirect-injection cryogenic solutions, the cryogenic fluid is conveyed from a cryogenic reservoir carried onboard the refrigerated truck (generally underneath the truck) to one or more heat exchangers situated inside the cold chamber or chambers of the truck, the exchangers being provided with means of circulating air. These exchangers allow the air internal to the chamber in which the products are stored, the air surrounding the exchangers, to be cooled to the desired temperature.

The heat extracted from the air first of all allows complete evaporation of the cryogenic fluid circulating through the exchanger, then allows the temperature thereof to be raised to a temperature close to that of the space. The cryogenic fluid leaving the exchanger is then discharged to the outside having given up the maximum amount of cooling energy.

This indirect injection technology proves to be particularly easy and effective if the temperature external to the truck (ambient temperature) is higher than the desired reference temperature (which typically it is when it is frozen goods that are being transported). However, where there is a desire to transport "fresh" goods (for example greengrocery products or even flowers) and the external temperature is very negative (the winter period in Europe, in Nordic countries, Canada, etc), it becomes very difficult if not impossible to regulate such a solution of indirect injection of a cryogenic fluid effectively. Additional "heating" is therefore essential.

Such refrigerated transports, whether they operate using mechanical cold or indirect injection (CTI) of a cryogenic fluid, provided with a heating solution to be employed under such extreme external temperature conditions have therefore been proposed on the market, notably in the abovementioned countries, whether for heating at certain moments the chamber in which the products are stored or whether for heating the driver's cab for driving comfort.

The following solutions may notably be cited:
  the blowing of hot air notably into the driver's cab;
  diesel heating systems using a closed water circuit;
  solutions proposed by the haulage companies using "mechanical cold" technology producing heat by simply using the compressor of the refrigeration system and running it "backward". This system indeed makes it possible to prevent fresh goods from freezing but certainly does not allow the temperature to be kept around a reference temperature with any degree of precision.

Undeniably then, heating solutions do therefore exist in this transport industry, but the present invention seeks to propose a technical heating solution that is optimized in terms of the following aspects:
  the location of the heating in the storage chamber or chambers i.e. the integration of the heating into the chambers and its physical interfacing with the means performing the indirect injection of the cryogen;
  the control/regulation of the heating and the way in which this control will interact with the regulation of the indirect-injection cooling traditionally present on such trucks.

Specifically, as is well known to those skilled in the art, solutions these days exist on such indirect-injection transports for controlling the temperature of the air internal to the body in which the transported products are stored, chiefly using algorithms that control the opening/closing of the valves that supply the exchangers with cryogen.

BRIEF SUMMARY OF THE INVENTION

As will be seen in greater detail in what follows, the present invention proposes a configuration and an operation in which:
  the heating means is located in the relevant cold chamber at a location at which the blower or blowers of the indirect-inject cooling system can agitate the hot air produced by the heating means i.e. in which all or some of the hot air can be blown into the intake side of the blower or blowers of the cold-producing system;

and in which, for preference, regulation of the operation of the heating means and regulation of the indirect-injection cooling cooperate and interact.

The invention therefore relates to a vehicle for transporting heat-sensitive products in a refrigerated truck, of what is referred to as the indirect injection type, the truck being provided:

with at least one product storage chamber, with a reserve of a cryogenic fluid such as liquid nitrogen, with a main heat exchanger system through which the cryogenic fluid circulates, and with an air circulation system, for example of the blowers type, able to bring the air internal to the chamber into contact with the cold walls of the main heat exchanger, the truck additionally comprising a heating system able to heat the air internal to at least one of the storage chambers, which heating system comprises at least one blower for agitating hot air internal to said at least one chamber, the internal air of which is to be heated, characterized in that the positioning of the hot air agitating blower within said at least one chamber is such that it allows hot air to be blown into the intake side of the or of some of the cold-production blowers.

Mention will be made in what follows of a main heat exchanger system or alternatively a cold-producing heat exchanger system, cold-producing blowers, in order to distinguish these means from the heat-exchanger and blower means involved in the "heating" function ("hot air agitation blower", "heating heat exchanger", etc).

According to one of the embodiments of the invention, which according to the invention is preferred, the fact that hot air is blown into the intake side of the cold-producing blower or blowers should be understood as meaning that the hot air is blown into a zone of the chamber in which the velocity vector of the air, with the door closed, is non-zero.

According to another of the embodiments of the invention, the heating system is brought into operation with the doors open (for example when the doors are open in order to load goods), the heating then countering a potential ingress of very cold air coming in from outside.

The invention may also adopt one or more of the following technical features:

A/ the heating system is a hot water type fan heater system, of the type in which the air to be heated, derived from outside and/or inside the chamber, is blown, by said hot air agitating blower, through a heating heat exchanger preferably situated inside the chamber, which heating heat exchanger is supplied with hot water produced by a boiler situated on the vehicle outside the chamber.

This is in fact because it is preferable to situate the water exchanger inside the relevant chamber but, according to an alternative embodiment, the water exchanger could be situated in a tunnel or technical duct of the truck i.e. in the flares of the walls.

B/ the heating system is an "air heating" type system in which hot air, produced by a boiler situated on the vehicle outside the chamber, is blown into the chamber using said agitating blower.

C/ the heating system is an "air heating" type system in which hot air is blown into the chamber by said agitation blower, the source of heat for heating air blown into the chamber being, according to this embodiment, connected to the truck engine.

The heat recuperated comes for example from the engine cooling circuits, which themselves use a heat-transfer liquid.

One of the following two solutions can then be adopted:

extending the circuit for this fluid as far as the main heat exchanger system through which the cryogenic fluid exchanger (CTI) circulates, possibly with the intervention of a pump;

installing a liquid/liquid or liquid/air exchanger to recuperate this heat and then send it into the chamber (via, for example, a blown hot air or a water exchanger).

The invention also relates to a method for transporting heat-sensitive products in a refrigerated truck, of the type referred to as the indirect injection type, in which the truck is provided:

with at least one product storage chamber, with a reserve of a cryogenic fluid such as liquid nitrogen, with a main heat exchanger system through which the cryogenic fluid circulates, and with an air circulation system, for example of the blowers type, able to bring the air internal to the chamber into contact with the cold walls of the main heat exchanger system, the truck additionally comprising a heating system able to heat the air internal to at least one of the chambers, which heating system comprises a blower for agitating hot air internal to said at least one chamber, the internal air of which is to be heated, the method being characterized in that the heating system is brought into operation on the basis of acknowledgment of one or more events, by blowing hot air into the intake side of one or of several of the cold-producing blowers.

The invention may also adopt one or more of the following technical features:

A/ the heating system is a hot water type fan heater system, in which the air to be heated, derived from outside and/or inside the chamber, is blown, by said hot air agitating blower, through a heating heat exchanger preferably situated inside the chamber, the internal air of which is to be heated up, which heating heat exchanger is supplied with hot water produced by a boiler situated on the vehicle outside the chamber, and on the basis of said acknowledgement of one or more events, the heating system is brought into operation as follows:

hot water produced by the boiler is let into the heating heat exchanger, the hot air agitating blower is switched on so as to bring air internal (or external) to the chamber into contact with the walls of the heat exchanger, all or some of the air thus heated being conveyed to the intake side of one or of several of the cold-producing blowers present in the chamber.

B/ The heating system is an "air" type system in which hot air, produced by a boiler situated on the vehicle outside the chamber, is blown into the chamber using said agitating blower, and on the basis of said acknowledgement of one or several events, the heating system is brought into operation as follows:

the sending of hot air from the boiler into the chamber is triggered;

said hot air agitation blower is set in operation to blow all or some of this hot air into the intake side of one or several of the cold-producing blowers present in the chamber.

C/ The heating system is brought into operation automatically via the detection of at least one of the following events:

a sensor of temperature external to the vehicle has detected that this temperature is below a reference temperature internal to the chamber;

a sensor of temperature internal to the chamber has detected that this chamber is below a reference for temperature internal to the chamber.

D/ The heating system is brought into operation semi-automatically by the intervention of the driver of the vehicle who has anticipated the fact that he is to switch from transporting frozen products to transporting fresh products and has therefore decided on the strength of this event to start the heating system.

E/ the heating system is brought into operation semi-automatically by the intervention of the driver of the vehicle who, in response to a warning signal following the detection of at least one of the following events, allows the heating system to be brought into operation:

a sensor of temperature external to the vehicle has detected that this temperature is below a reference temperature internal to the chamber;

a sensor of temperature internal to the chamber has detected that this temperature is below a reference for temperature internal to the chamber.

F/ There is a unit managing and controlling the production of cold, able to regulate the temperature $T_{int}$ internal to the chamber to a reference value $T_{ref}$ by ordering a closing or opening, or the degree of such opening/closing, of one or more valves supplying the main (cold-producing) heat exchanger system with cryogenic fluid and use is made of the fact that the management/control of the production of cold and the heating system are interfaced as follows: the cold production management and control unit is able, upon the said switching-on of the heating system, to bring the cold-production air circulation system into operation or maintain the operation thereof while at the same time closing the valve or valves supplying the cold-producing heat exchanger system with cryogenic fluid.

G/ there is a unit managing and controlling the production of cold, able to regulate the temperature $T_{int}$ internal to the chamber to a reference value $T_{ref}$ by ordering a closing or opening, or the degree of such opening/closing, of one or more valves supplying the cold-producing heat exchanger system with cryogenic fluid and use is made of the fact that the management control of the production of cold and the heating system are interfaced as follows:

the management and control unit is able to control one or more of the following elements:

a) the boiler power level,
b) the flow rate of water supplied to the heating heat exchanger when the heating system is a system of the hot water fan heater type;
c) the quantity of air sent across the cold-producing exchangers, for example by varying the speed of the cold-producing blower or blowers and/or by varying the speed of the hot air agitation blower or blowers.
d) the directing of hot air toward a chamber selected from the chambers of the truck, the heating system being a system of the "air" type in which hot air produced by a boiler situated on the vehicle external to the chamber is blown into the truck.
e) the temperature of the water in the heating heat exchanger when the heating system is a system of the hot water fan heater type, for example by altering the power of the boiler and/or by altering the flow rate of water supplied to the heating heat exchanger.

regulating the temperature $T_{int}$ internal to the chamber to a reference value $T_{ref}$ that also takes account of one or more of said elements a) to e).

BRIEF DESCRIPTION OF THE SEVERAL VIEWS OF THE DRAWINGS

Other features and advantages of the present invention will become more clearly apparent from the following description, given by way of entirely nonlimiting illustration with reference to the attached drawings in which.

DETAILED DESCRIPTION OF THE INVENTION

Figure 1:
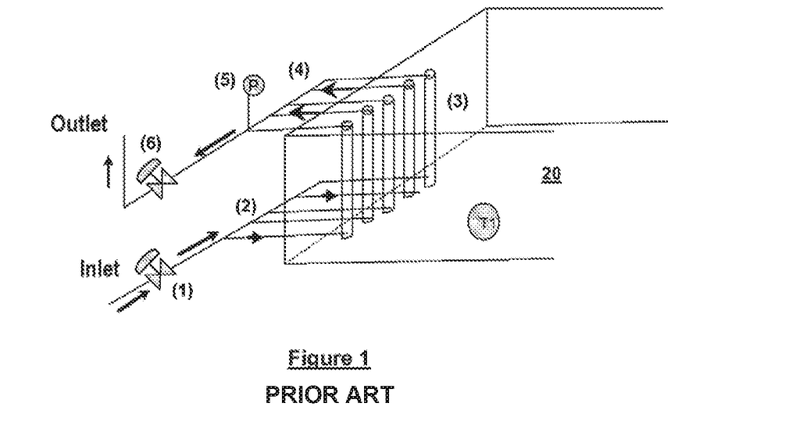
FIG. 1 is a partial schematic view of a device supplying a transport truck according to the prior art.

FIG. 1 provides a clear and simple illustration of how such refrigerating transports using indirect injection (CTI) currently work, notably of how the all-or-nothing valves currently present at the inlet to the circuit (upstream of the exchangers) and the outlet of the circuit (downstream of the exchangers) work.

The quantity of cryogen, for example liquid nitrogen, supplied to such a CTI process (chamber 20 internal to the truck, which chamber is equipped with exchangers 3) is typically regulated these days using at least two all-or-nothing valves 1 and 6, one at the inlet and one at the outlet, the method then comprising at least the following elements, seen in the following order:

a reservoir of liquid nitrogen (not depicted in FIG. 1),
an all-or-nothing valve 1 at the inlet, normally closed, allowing the supply of cryogen, for example nitrogen, to the circuit;
a means of distributing the liquid nitrogen (for example of the manifold type, "2" in the figure),
evaporators 3 (heat exchangers) internal to the truck,
a manifold 4 for collecting the gaseous nitrogen leaving the exchangers,
a pressure sensor 5,
an all-or-nothing valve 6 at the outlet, which is normally open,
a pipe of suitable diameter connecting these elements.

In addition, the following can be found in the chamber 20:

ventilation systems (which for reasons of clarity have not been depicted in the figure but which can better be seen in the context of the attached FIG. 2), which are positioned near the exchangers, making it possible to intensify exchanges of heat between the ambient air internal to the chamber and the exchangers (by drawing air from the chamber through the exchangers and thus forcing it to come into contact with the exchangers) and thus evening out the air temperature internal to the chamber.

A temperature probe (T1) manages the opening and closing of the all-or-nothing inlet valve 1; this probe is situated for example at the entry to the path followed by the air through the exchangers and measures the temperature of the air in the chamber before it is cooled within the exchangers. Other positioning for the probe T1 are of course possible (in the internal atmosphere at the heart of the storage chamber or alternatively in the cold gases leaving the relevant exchanger as a result of the action of the ventilation).

Figure 2:
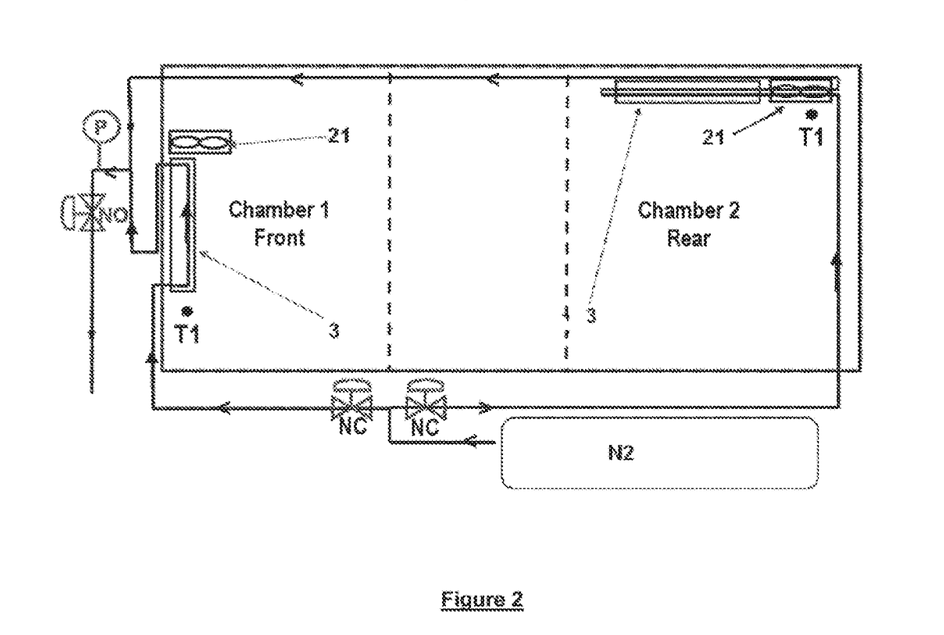
FIG. 2 supplies the detail of an example of a body internal to a transport truck (in part view from the side), here comprising two product storage chambers (for example one chamber for fresh produce and another chamber for frozen products), and notably giving a better visual of how the exchangers work and the position of the ventilation systems for producing cold, for the embodiment exemplified here.

For each additional chamber, a further supply circuit comprising, for example, an all-or-nothing valve at the inlet that is normally closed, heat exchangers, a normally open all-or-nothing outlet valve, etc is added (an example of a situation with two chambers and of the position of the temperature probes is illustrated in the attached FIG. 2).

Refrigeration in the all-or-nothing mode according to this prior art typically takes place in two phases:

1—On start-up or after the opening of a door, a pulldown phase in which the temperature is lowered rapidly is adopted.

2—Once the reference temperature has been reached (probe T1 in the chamber), a control/regulation mode is adopted which allows the temperature of the chamber to be held at the reference value.

The operation of the CTI process in this all-or-nothing mode is typically as follows. When the measured temperature T1 is above the reference temperature, the inlet valve 1 opens (the outlet valve 6 by default already being open) thus allowing cryogen to be supplied to the exchangers. The liquid nitrogen transforming into a gas releases frigories which are absorbed by the air in contact with these exchangers. The blowers recuperate this cooled air in order to circulate it around the chamber. The gaseous nitrogen is then discharged out of the chamber into the surrounding atmosphere. When the measured temperature T1 reaches the reference temperature, the inlet valve 1 closes, thus halting the supply of cryogen to the exchangers and therefore the cooling of the air internal to the chamber. The reduction in the temperature of the chamber and the holding of this temperature are achieved using the cycles of opening and closing of the valve 1. The frequency and duration of opening of the valve 1 will be higher during the pulldown phase than during the control/regulation phase. When the valve 1 opens, whatever the phase being considered, the flow rate of cryogen introduced into the heat exchangers will be dependent solely on the nitrogen pressure in the reservoir and the pressure drops across the various components of the installation.

The foregoing illustrates one implementation according to the prior art using all-or-nothing valves at the inlet and outlet of the circuit, but other modes of supply have been considered, notably implying a combination of all-or-nothing valves and proportional valves, and reference may be made to document FR-2 969 061.

FIG. 2 for its part provides a better visual of the details of an example of a body internal to a transport truck (viewed from the side), here comprising two product storage chambers (for example one chamber for fresh produce and another chamber for frozen products) and notably providing a better visual of how the exchangers and cold ventilation systems are positioned for the embodiment exemplified here.

For each chamber, there is here, upstream, a normally closed ("NC") all-or-nothing inlet valve, each chamber is equipped with heat exchangers 3 (which are vertical on the side of the chamber in the case of the chamber 1 and horizontal at the top of the body in the case of chamber 2), through which the cryogen from the N2 tank situated underneath the truck circulates, the streams of gas obtained at the outlet of each chamber are sent to a collecting pipe, here provided with a single normally open ("NO") all-or-nothing outlet valve.

Further, it can readily be visualized here for this embodiment that in each chamber there is a temperature probe (T1) that manages the opening and closing of each all-or-nothing inlet valve and which is situated:

in the case of the chamber 1, at the inlet to the path of the air through the exchangers 3 (the blowers 21 being situated on the other side of the exchangers and drawing air toward them through the exchangers), the probe therefore measuring the temperature of the air in the chamber before it is cooled in the exchangers;

in the case of chamber 2 once again at the inlet to the path of the air through the relevant exchangers 3 i.e. substantially at the blowers 21 which in this instance push the air into the exchangers.

Figure 4:
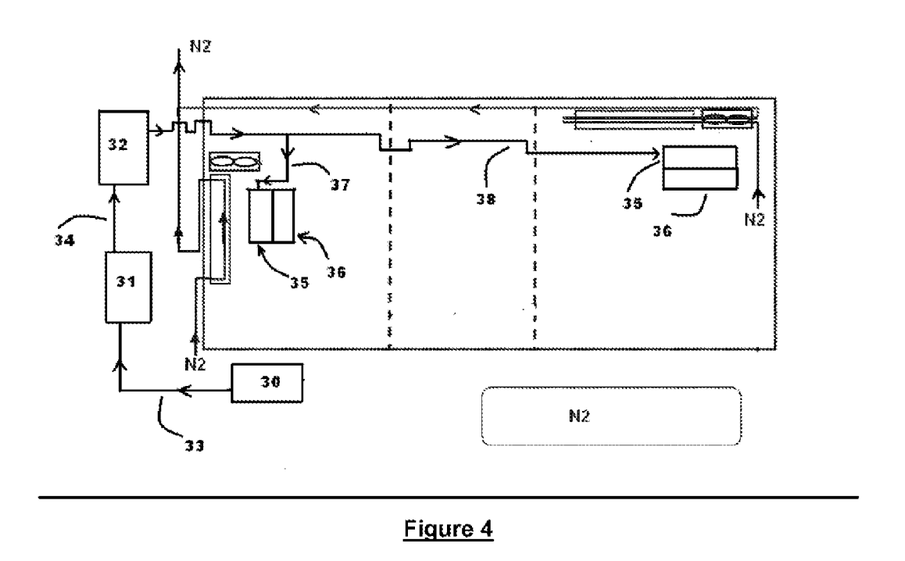
FIGS. 4 and 5 illustrate in partial schematic views embodiments according to the invention, respectively for the case of heating using water and the case of heating using air.
Figure 5:
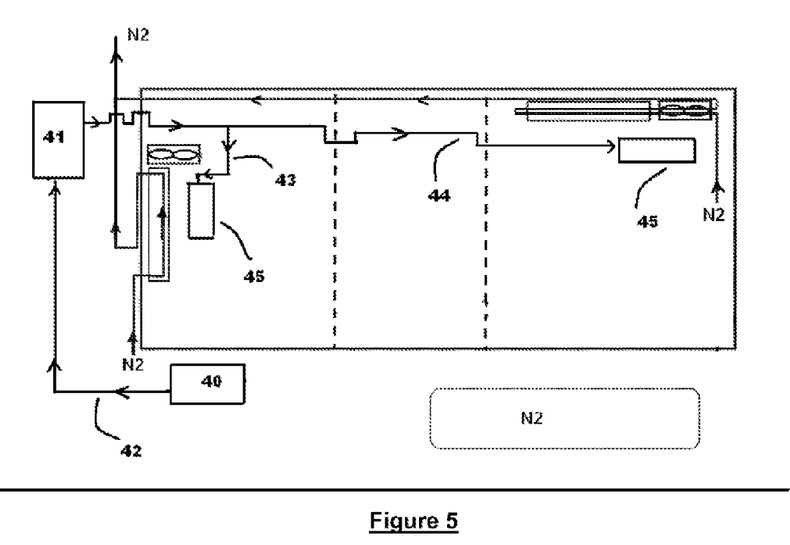

FIGS. 4 and 5 therefore, in partial schematic views, illustrate embodiments according to the invention respectively for the case of heating with water and the case of heating with air.

FIGS. 4 and 5 have been devised on the basis of FIG. 2 which has been simplified in order to feature the elements essential to understanding the embodiments of the invention which have been illustrated here, without adversely affecting the legibility of the figures.

Therefore the following elements can be recognized in FIG. 4:

the presence of a fuel tank 30: in this instance an "additional" tank has been provided but it would also be possible, without departing from the scope of the present invention, to tap into the vehicle tank;

this tank 30 is used to supply fuel (line 33) to a boiler 31 which supplies hot water (line 34) to an expansion tank 32 usually present on this type of water heating installation. This idea of an expansion tank is also well known to those skilled in the art: with or without a diaphragm (if it has no diaphragm then it is traditionally situated at the high point of the water circuit) it acts both as a water tank and contributes to regulating the pressure in the water circuit. In this instance it is preferably positioned on the front face, somewhere near the boiler.

The idea of a water fan heater is well known to those skilled in the art and we shall therefore detail it no more than is necessary. The hot water fan heater is a generator that blows hot air into a space or a room. This heating system uses the principle of forced convection. The air that is to be heated comes from inside or outside the room or alternatively from a mixture of these two origins. This air passes through an exchanger which is supplied with hot water produced by a boiler, the boiler being fired for example by natural gas. The hot water produced by the boiler is therefore directed to a water/air exchanger with which a ventilation system is associated, the exchanger therefore transmits the heat of the hot water to the air which is then blown into the room by the blower. And it is indeed the elements essential to this form of operation that we find in this FIG. 3.

a heating heat exchanger/fan heater 35 in each of the chambers is therefore supplied with hot water from the expansion tank 32;

a ventilation system 36 for agitating the hot air is therefore positioned facing each of the exchangers 35, this system being able, according to the invention and because of its highly advantageous siting, to blow the hot air surrounding the exchanger 35 into the intake side of the cold-producing blower or blowers 21.

FIG. 5 for its part illustrates one implementation of the invention that uses heating using air, in which hot air, produced by a boiler situated on the vehicle outside the chamber, is blown into the relevant chamber by an agitation blower. And the following can therefore be recognized in this FIG. 4:

the presence of a fuel tank 40: once again, without departing from the scope of the present invention, a tapping could be made from the vehicle fuel tank;

this tank 40 is used (line 42) to supply fuel to a boiler 41 which produces hot air and supplies hot air (lines 43 and 44) to a (or at least one of the) ventilation system(s) 45 present in each chamber and able, according to the invention and on account of its highly advantageous siting, to blow hot air into the suction side of the cold-producing blower or blowers 21.

Figure 3:
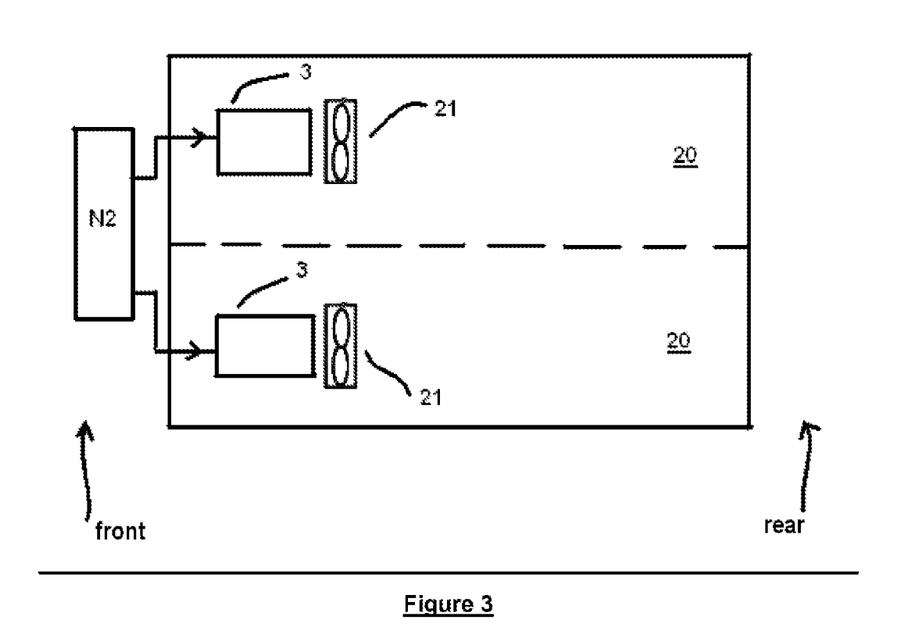
FIG. 3 provides another example of a body internal to a transport truck (in part view from above), here comprising two product storage chambers (for example one chamber for fresh produce and another chamber for frozen products), the two chambers here being organized with longitudinal symmetry.

As will be clearly apparent to a person skilled in the art, while the invention has been illustrated more particularly in the foregoing for the case of "transverse" chambers (FIGS. 4 and 5) it can be adapted just as effectively for supplying heating to one or each of the chambers of trucks in which the chambers are organized with longitudinal symmetry, as in the infrastructure of FIG. 3, in which the cryogen reservoir in this instance is at the front of the vehicle.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a" "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method for transporting heat-sensitive products in a refrigerated truck, said method comprising the steps of:
   providing a refrigerated transport truck containing heat-sensitive products, said truck comprising:
      at least one product storage chamber;
      a reserve of a cryogenic fluid;
      a main heat exchanger system adapted and configured to allow the cryogenic fluid to circulate through the main exchanger system, the main heat exchange system comprising walls across which heat may be exchanged;
      one or more cold-producing blowers adapted and configured to bring air inside the chamber into contact with the walls;
      a first temperature sensor adapted and configured to sense a temperature external to the truck;
      a second temperature sensor adapted and configured to sense a temperature in the chamber; and
      a heating system adapted and configured to heat air inside the chamber, the heating system comprising an agitating blower for agitating the heated air inside the chamber;
   utilizing the heating system, upon the occurrence of one or more events, to blow heated air into an intake side of one or more of the cold-producing blowers, wherein:
      said one or more events being selected from: the group consisting of i) the temperature sensed by the first temperature sensor being below a first reference temperature, and ii) the temperature sensed by the second temperature sensor being below a second reference temperature;
   wherein:
      said utilization of the heating system is accomplished by: producing hot water with a boiler situated on the vehicle outside the chamber; letting the produced hot water into the heating heat exchanger; switching on the agitating blower so as to bring air into contact with the walls of the heat exchanger and produced heated air; and conveying the heated air to an intake side of one or of several of the cold-producing blowers present in the chamber; and
      said utilization of the heating system being done either automatically upon the occurrence of the one or more events or with the intervention of an operator of the truck upon the occurrence of the one or more events.

2. The method of claim 1, wherein the heating system is brought into operation automatically via detection of at least one of the following events:
   a temperature external to the vehicle is detected as being below a reference temperature internal to the chamber;
   a temperature inside the chamber is detected as being below a reference temperature internal to the chamber.

3. The method of claim 1, wherein:
   the truck further includes a unit managing and controlling the production of cold air that is adapted and configured to regulate a temperature $T_{int}$ internal to the chamber to a reference value $T_{ref}$ by ordering closing or opening, or the degree of such opening or closing, of one or more valves supplying the heat exchanger system with cryogenic fluid; and the managing and controlling unit manages the main heat exchanger system, said one or more cold-producing blowers, and the heating system as follows: upon actuating of the heating system, production of cold air from the main heat exchanger system and said one or more cold-producing blowers is operated or its operation is maintained while at the same time, the valve or valves are closed.

4. The method of claim 1, wherein:

the truck further comprises a unit managing and controlling the production of cold that is adapted and configured to regulate a temperature $T_{int}$ internal to the chamber to a reference value $T_{ref}$ by ordering a closing or opening, or the degree of such opening or closing, of one or more valves supplying the main heat exchanger system with cryogenic fluid;

wherein:

the management and control unit is able to control one or more of the following elements:
  a) a boiler power level;
  b) a flow rate of water supplied to the heating heat exchanger;
  c) a quantity of air sent across the main heat exchanger system by varying a speed of the at least one cold-producing blower and/or by varying a speed of the at least one agitating blower;
  d) a temperature of water in the heating heat exchanger by altering a power of a boiler and/or by altering a flow rate of water supplied to the heating heat exchanger; and said method further comprises the step of regulating a temperature $T_{int}$ internal to the chamber to a reference value $T_{ref}$ that also takes into account said one or more of said elements a) to d).

5. A method for transporting heat-sensitive products in a refrigerated truck, said method comprising the steps of:

providing a refrigerated transport truck containing heat-sensitive products, said truck comprising:
  at least one product storage chamber,
  a reserve of a cryogenic fluid,
  a main heat exchanger system adapted and configured to allow the cryogenic fluid to circulate through the main exchanger system, the main heat exchange system comprising walls across which heat may be exchanged,
  one or more cold-producing blowers adapted and configured to bring air inside the chamber into contact with the walls,
  and a heating system adapted and configured to heat air inside the chamber, the heating system comprising an agitating blower for agitating the heated air inside said chamber;

utilizing the heating system, upon the occurrence of one or more events, to blow heated air into an intake side of one or more of the cold-producing blowers, wherein:

said one or more events being selected from the group consisting of: i) the temperature sensed by the first temperature sensor being below a first reference temperature, and ii) the temperature sensed by the second temperature sensor being below a second reference temperature; and said utilization of the heating system is accomplished by: triggering sending of hot air from the boiler into the chamber; producing hot air with a boiler of the heating system that is situated on the vehicle outside the chamber; and initiating operation of said agitating blower to blow all or some of the produced hot air into the intake side of one or more of said cold-producing blowers present in the chamber; and said utilization of the heating system being done either automatically upon the occurrence of the one or more events or with the intervention of an operator of the truck upon the occurrence of the one or more events.

6. The method of claim 5, wherein the heating system is brought into operation automatically via detection of at least one of the following events:

a temperature external to the vehicle is detected as being below a reference temperature internal to the chamber;

a temperature inside the chamber is detected as being below a reference temperature internal to the chamber.

7. The method of claim 5, wherein:

the truck further includes a unit managing and controlling the production of cold air that is adapted and configured to regulate a temperature $T_{int}$ internal to the chamber to a reference value $T_{ref}$ by ordering closing or opening, or the degree of such opening or closing, of one or more valves supplying the heat exchanger system with cryogenic fluid; and the managing and controlling unit manages the main heat exchanger system, said one or more cold-producing blowers, and the heating system as follows: upon actuating of the heating system, production of cold air from the main heat exchanger system and said one or more cold-producing blowers are operated or operation of the one or more cold-producing blowers is maintained while at the same time, the valve or valves are closed.

8. The method of claim 5, wherein:

the truck further includes a unit managing and controlling the production of cold that is adapted and configured to regulate a temperature $T_{int}$ internal to the chamber to a reference value $T_{ref}$ by ordering closing or opening, or the degree of such opening or closing, of one or more valves supplying the main heat exchanger system with cryogenic fluid; and the managing and controlling unit manages the main heat exchanger system, said one or more cold-producing blowers, and the heating system as follows:

the management and control unit is able to control one or more of the following elements:
  a) a boiler power level;
  b) a quantity of air sent across the main heat exchanger system by varying a speed of the at least one cold-producing blower and/or by varying a speed of the at least one agitating blower; and
  c) directing heated air toward one of the chambers; and said method further comprises the step of regulating a temperature $T_{int}$ internal to the chamber to a reference value $T_{ref}$ that also takes account of one or more of said elements a) to c).

* * * * *